United States Patent [19]

Chatrathi et al.

[11] Patent Number: 4,949,748

[45] Date of Patent: Aug. 21, 1990

[54] BACKFLASH INTERRUPTER

[75] Inventors: SriKrishna Chatrathi; Robert L. DeGood, both of Blue Springs, Mo.

[73] Assignee: Fike Corporation, Blue Spring, Mo.

[21] Appl. No.: 317,768

[22] Filed: Mar. 2, 1989

[51] Int. Cl.$^5$ ............................................. F16K 17/00
[52] U.S. Cl. ..................................... 137/115; 137/70; 137/467
[58] Field of Search ................... 48/192; 137/115, 70, 137/467; 220/89 A

[56] References Cited

U.S. PATENT DOCUMENTS

| | | |
|---|---|---|
| 952,938 | 3/1910 | Pannenborg . |
| 1,345,206 | 6/1920 | McBride . |
| 1,907,976 | 5/1933 | Jones ..................................... 48/192 |
| 2,899,984 | 8/1959 | Gaffin . |
| 2,918,941 | 12/1959 | Whiting . |
| 3,186,744 | 6/1965 | Smith et al. . |
| 3,248,854 | 5/1966 | Plass . |
| 3,288,578 | 11/1966 | Witt ..................................... 137/467 X |
| 3,621,871 | 11/1971 | Zimmerle et al. . |
| 3,689,239 | 9/1972 | Eriksson . |
| 3,730,049 | 5/1973 | Andrew . |
| 3,923,475 | 12/1975 | Stenzel et al. . |
| 3,933,444 | 1/1976 | Kilgore . |
| 4,011,662 | 3/1977 | Davis et al. . |
| 4,204,849 | 5/1980 | Johnston . |
| 4,255,169 | 3/1981 | Leliaert et al. . |
| 4,261,386 | 4/1981 | Young ..................................... 137/467 |
| 4,273,151 | 6/1981 | Nezworski ..................................... 137/115 |
| 4,341,041 | 7/1982 | Bloomfield ..................................... 220/89 A |
| 4,342,251 | 8/1982 | Wahlfeldt et al. . |
| 4,528,999 | 7/1985 | Tonellato . |
| 4,552,573 | 11/1985 | Weis et al. . |

FOREIGN PATENT DOCUMENTS 2704801  8/1978  Fed. Rep. of Germany ...... 137/467

OTHER PUBLICATIONS

Explosions Course Prevention Protection; W. Bartknecht; Springer-Verlag; Berlin Heidelberg New York 1981; pp. 224 and 226.

Primary Examiner—Robert G. Nilson
Attorney, Agent, or Firm—Hovey, Williams, Timmons & Collins

[57] ABSTRACT

A backflash interrupter device is provided which can be placed in-line in a run of pipe, duct, or the like for preventing a pressure wave and any subsequent flame front traveling along the run from passing beyond the device. The preferred backflash interrupter device includes a chamber base and a vent cap cooperatively defining a transfer chamber with at least two fluid-conducting members coupled therewith with the distal ends thereof configured for coupling with respective terminal ends of portions of the run of pipe, duct, or the like.

10 Claims, 1 Drawing Sheet

BACKFLASH INTERRUPTER

BACKGROUND OF THE INVENTION

1. Field of the Invention

The present invention concerns a backflash interrupter device for in-line placement in a run of pipe, duct, or the like for preventing a pressure wave and any subsequent flame front traveling along the run from passing beyond the device. More particularly, the invention is concerned with an apparatus having structure for venting the pipe run in the event of excess pressure in order to interrupt the progress of a pressure wave any subsequent flame front traveling therealong thereby preventing consequent damage to equipment connected to the run.

2. Background of the Prior Art

Flammable or explosive materials in the form of vapors or fluidized particles, for example, are often conveyed by runs of pipe, duct, or the like which may interconnect various pieces of equipment If ignition of the material occurs, a pressure wave and potentially subsequent flame front may spread by way of the interconnecting pipes or duct work to other pieces of equipment, thereby magnifying the risk of injury to personnel or equipment damage. In view of this problem, pieces of equipment handling explosive or flammable material are often equipped with relief valves, relief vents, rupture discs, relief panels, and so forth which require that the equipment be designed with these features, or provided with such as a retrofit.

These prior art solutions, if properly designed, can effectively limit the damage to a particular piece of equipment but are not designed or intended to protect the pipeline or duct work itself, or to prevent passage of the pressure wave or flame front through the run of pipe or duct. That is to say, the prior art devices are designed to protect the specific pieces of equipment to which they are attached, but are not designed to protect the pipeline or duct work or prevent spread of the ignition effects therethrough.

SUMMARY OF THE INVENTION

The present invention solves the prior art problems as outlined above. That is to say, the invention hereof provides a device allowing in-line placement in a run of pipe, duct, or the like which prevents a pressure wave and any subsequent flame front traveling along the run from passing beyond the device into adjacent portions of the run and equipment connected thereto.

The preferred backflash interrupter device of the present invention broadly includes chamber structure defining an enclosed chamber and including a pressure responsive vent cap for opening the chamber for exterior venting upon the occurrence of a predetermined level of pressure in the chamber. Respective first and second fluid conducting members are coupled with the chamber in a non-aligned relationship thereat in order to prevent direct in-line fluid flow between the members. The distal ends of the connecting members are configured for in-line connection in the run of pipe, duct, or the like between adjacent portions of the run.

In one preferred embodiment of the invention, the conducting members are coupled with the chamber structure in a concentric relationship. In another embodiment, the conducting members are coupled with the chamber in a spaced-apart relation ship, and the chamber end of at least one of the members is equipped with a closure device which automatically closes that member end when the chamber is vented. Other preferred aspects are discussed further hereinbelow.

BRIEF DESCRIPTION OF THE DRAWING FIGURES

DETAILED DESCRIPTION OF THE PREFERRED EMBODIMENT

Figure 1:
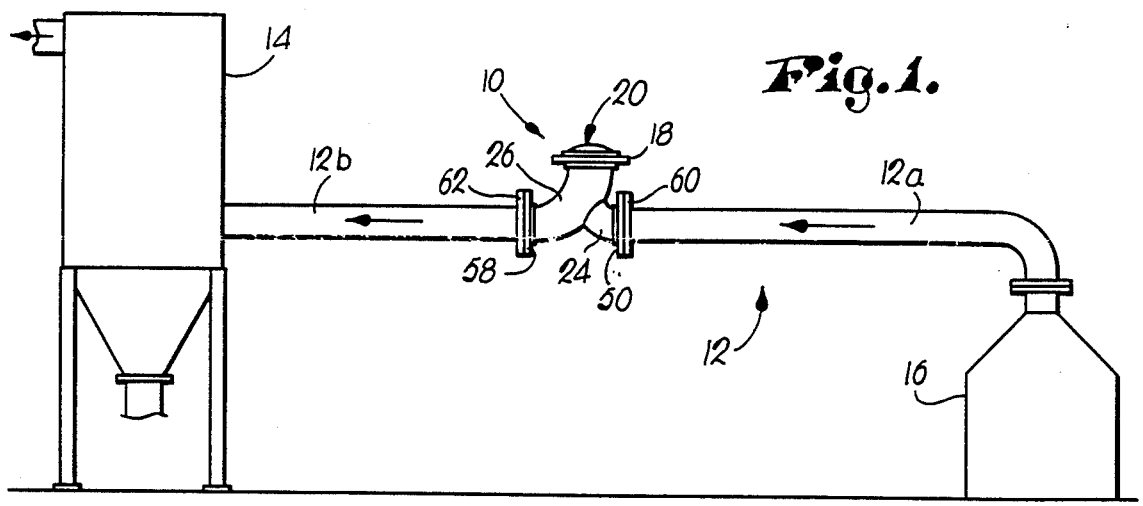
FIG. 1 illustrates one embodiment of the preferred interrupter device installed in-line in a run of pipe interconnecting two pieces of equipment as an exemplary usage.

FIG. 1 illustrates one embodiment of backflash interrupter device 10 in a preferred environment of use in which device 10 is placed in-line in a run 12 of pipe interconnecting a conventional dust collector 14 and dust collection hood 16. Vacuum induced airflow fluidizes and conveys flammable or explosive dust particles from hood 16 through run portion 12a, into device 10, and therefrom through run portion 12b and into dust collector 14 in the direction as shown by the arrows.

Figure 2:
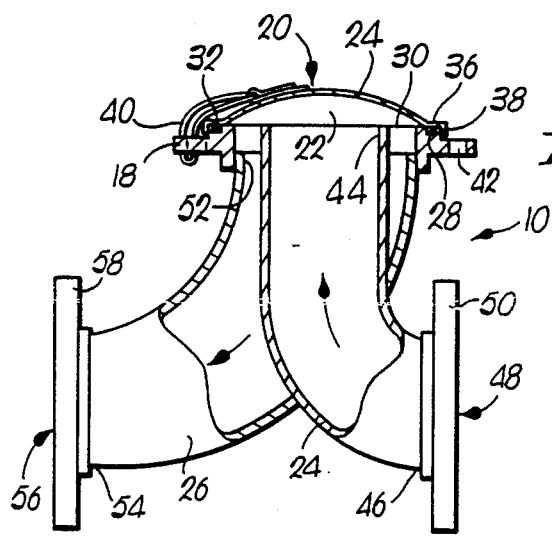
FIG. 2 is a partial sectional view of the interrupter device of FIG. 1.

FIG. 2 illustrates a partial sectional view of the embodiment of device 10 shown in FIG. 1 which includes chamber structure or base 18 and vent cap 20 which together define enclosed transfer chamber 22, and which further includes inlet conductor pipe 24 and outlet conductor pipe 26.

Chamber base 18 is in the form of a conventional open-center, slip-on pipe flange having an annular groove 28 defined in upper face 30 thereof which contains a conventional 0-ring 32 therein.

Vent cap 20 is preferably composed of stainless steel and integrally configured to include dome 34 presenting an arcuate cross-section, annular flange portion 36, and downwardly extending lip 38 designed to fit about the upstanding face 30 of base 18 for centering cap 20 thereon. As illustrated in FIG. 2, O-ring 32 provides a seal between base 18 and cap 20 by engaging the lower surface of flange portion 36. In the environment of FIG. 1, the interior of device 10 and in particular chamber 22 are under a partial vacuum which holds cap 20 in place on base 18 with 0-ring 32 providing a seal therebetween.

Stainless steel cord 40 coupled with dome 34 also loops through respective bolt holes 42 in base 18 to act as a tether.

Inlet conductor pipe 24 is preferably in the form of a conventional non-reducing 90° pipe elbow and includes chamber end 44, inlet end 46 presenting port 48, and an inlet connection flange 50 welded to inlet end 46.

Outlet conductor pipe 26 is preferably in the form of a conventional reducing 90° pipe elbow and includes chamber end 52, outlet end 54 presenting port 56, and outlet connection flange 58 welded to outlet end 54. Chamber end 52 is placed and welded within the interior opening of chamber base 18 as illustrated in FIG. 2.

In the preferred embodiment illustrated in FIG. 2, inlet pipe 24 presents a smaller diameter in the vicinity of chamber end 44 than the diameter of outlet conductor pipe 26 in the vicinity of its chamber end 52. This allows that portion of inlet pipe 24 adjacent chamber base 18 to be located concentrically within outlet pipe 26. Pipes 24, 26 are placed in this relationship by cutting an appropriately sized hole in outlet pipe 26 through which chamber end 44 of inlet pipe 24 is placed. Inlet pipe 24 is then welded to outlet pipe 26 to seal the opening and hold pipes 24 and 26 in the concentric relationship illustrated.

In the preferred embodiment illustrated in FIGS. 1 and 2, backflash interrupter device 10 is sized as appropriate for the diameter of pipe run 12. For example, if run 12 is 4" pipe, outlet and inlet ports 48,56 and associated flanges 50,58 would also be sized for 4" with ports 48,56 axially aligned with pipe run portions 12a,b as shown with base 18 provided as a six-inch slip-on flange and outlet pipe 26 as a six-to-four inch reducing elbow. Device 10 can be conveniently placed in-line with pipe run 12 by bolting inlet flange 50 to a mated flange 60 on the exposed end of pipe run portion 12a, and by bolting outlet flange 58 to a mated flange 62 on the exposed end of pipe run 12b.

The preferred design of device 10 as illustrated in the drawing figures enables convenient and economical placement in-line with pipe run 12 either as a retrofit or new installation. For example, if backflash interrupter device 10 is to be installed as a retrofit, an appropriate length of pipe run 12 would be cut and removed and appropriately sized connection flanges 60,62 welded to the exposed ends of respective pipe run portions 12a,b for connection to inlet and outlet flanges 50,58 respectively. In the case of a new installation, pipe run 12 can be originally installed with pipe run portions 12a,b appropriately flanged and spaced for reception of device 10.

In the operation of the system as illustrated in FIG. 1, fluidized dust particles collected at hood 16 normally travel along pipe run portion 12a in the direction indicated by the arrow. The fluidized particles pass through device 10 and then along pipe run portion 12b in the direction of the arrow into dust collector 14. This air flow is created by a partial vacuum induced in dust collector 14 which in turn creates a partial vacuum in device 10 and pipe run portions 12a,b. This partial vacuum along with gravitational force holds vent cap 20 in place.

Fluidized particles from run portion 12a enter inlet pipe 24 through inlet end 48 and pass upwardly through inlet chamber end 44 into chamber 22. The flow direction then reverses and passes downwardly through outlet chamber end 52 into outlet conductor pipe 26 around the exterior of inlet pipe 24 contained therein. The flow then exits through outlet port 56 into run portion 12b.

In the event of ignition of the dust particles contained in the fluidized flow, a pressure wave traveling at the speed-of-sound typically precedes any subsequent flame front. When the pressure wave enters chamber 22 from either direction by way of pipe run portions 12a or 12b, vent cap 20 is blown off by the pressure wave but remains tethered to chamber base 18 by cord 40. This action opens chamber 22 and exposes chamber ends 44,52 of both pipes 24, 26 for exterior venting and prevents the pressure wave from propagating along run 12 beyond device 10. Any subsequent flame front traveling along either of pipe portions 12a or 12b also exits from device 10 by way of associated conductor pipe 24,26. The flame front is thereby prevented from entering the other conductor pipe and the adjacent pipe run portion. In other words, without vent cap 20 in place to redirect the fluid flow from one conductor pipe to the other, a pressure wave or flame front entering device 10 from either direction is exteriorally vented instead of passing into the other pipe portion.

As those skilled in the art will appreciate, device 10 can be designed for operation on a pressurized system by appropriate biasing of vent cap 10. For example, by designing vent cap 20 with a heavier weight or by adding weight to it, gravitational force can be used to define the predetermined pressure at which vent cap 20 is shifted to open chamber 22. Other biasing alternatives might include springs or shear bolts for example.

Figure 4:
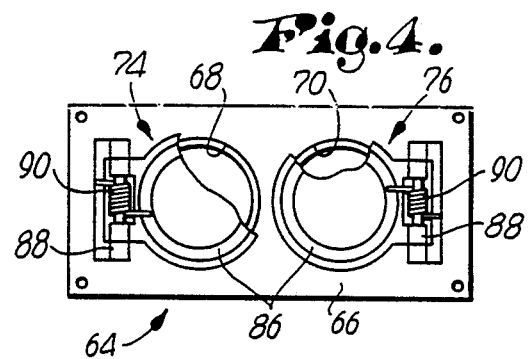
FIG. 4 is a partial top view of the device of FIG. 3 with the top cap removed and with portions of the closure flaps cut-away for clarity of illustration.
Figure 3:
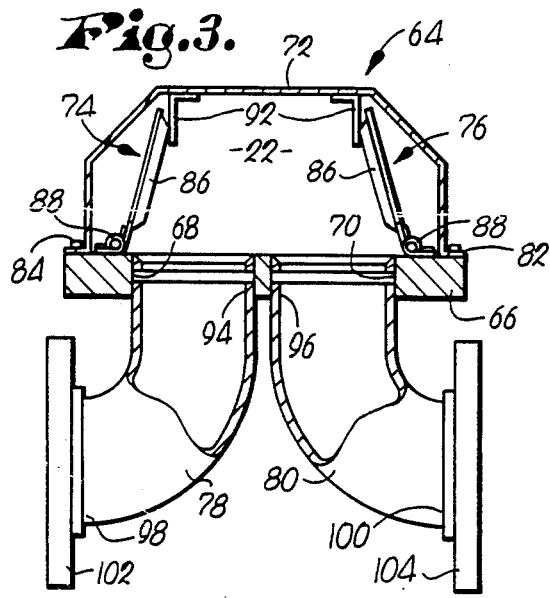
FIG. 3 is a partial sectional view of a second embodiment of the preferred device.

FIGS. 3 and 4 illustrate a second embodiment 64 of the backflash interrupter device of the present invention. Device 64 includes rectangularly-shaped, relatively flat chamber structure or base 66 having circularly-shaped connection openings 68, 70 defined therethrough. Device 64 also includes vent cap 72 presenting a channel-shaped cross-sectional configuration, closure structures 74,76, and conductor pipes 78,80.

Vent cap 72 integrally includes peripheral mounting flange 82 through which vent cap 72 is preferably coupled to chamber base 66 by four shear bolts 84 designed to release at a predetermined level of pressure within chamber 22.

Each closure structure 74,76 includes closure flap 86, hinge 88 shiftably coupling flap 86 to chamber base 66, biasing spring 90 biasing flap 86 toward a closed position as shown in FIG. 4, and stop tab 92 coupled to the upper wall of vent cap 72 for holding flap 86 in the open position against the bias of spring 90 as shown in FIG. 3.

Each flap 86 is circularly-shaped to fit a corresponding chamber opening 68, 70 which presents a mated surface for tight closure.

In the second embodiment, conductor pipes 78,80 are preferably conventional, non-reducing, 90° pipe elbows with respective chamber ends 94,96 thereof fitted respectively in openings 68,70 and welded in place. The respective distal ends 98,100 terminate at respective connection flanges 102,104.

Device 64 in the preferred second embodiment is configured as bi-directional from the standpoint of normal fluid flow therethrough without a designated inlet or outlet. In operation, normal fluid flow through one of conductor pipes 78,80 enters chamber 22 where cap 72 redirects the flow for outlet through the other conductor pipe. In the event of pressure above a predetermined level within chamber 22, shear bolts 84 release vent cap 72 to open chamber 22 thereby exposing pipe ends 94,96 for exterior venting. As vent cap 72 shifts outwardly, stop tabs 92 also shift outwardly allowing closure flaps 86 to shift to their respective closed position over chamber openings 68,70 under the bias provided by springs 90.

The provision of closure structures 74,76 ensures that any subsequent flame front emanating from one of pipes 78,80 does not enter the other pipe. Even though the flame front is venting exteriorally away from the chamber opening leading to the other pipe, this may be insufficient to prevent ignition therein when handling some flammable materials, especially flamable vapors. Hence, closure of that chamber opening by the associated closure structure prevents ignition of the unignited material. As those skilled in the art will appreciate, a pressure wave usually precedes any flame front which allows time for closure in response to the pressure wave prior to arrival of the flame front. If it is known from which direction a flame front will likely emanate, then only one closure structure may be required for closing the appropriate chamber opening.

Figure 5:
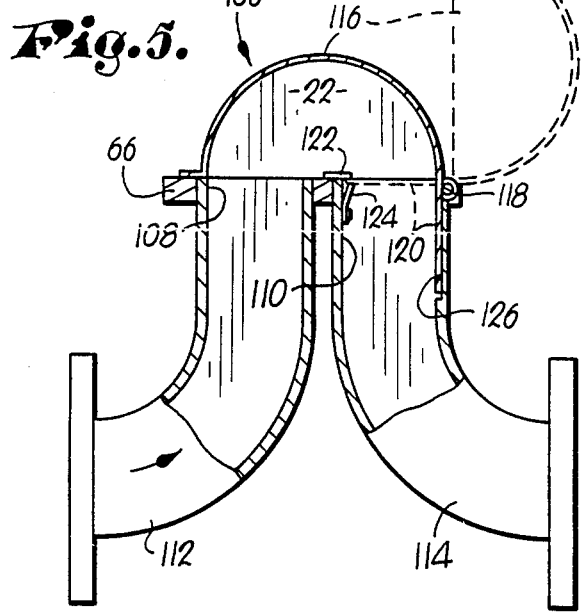
FIG. 5 is a partial sectional view of a third embodiment of the device illustrating a closure flap in the open position with the closed position shown in dashed lines.

FIG. 5 illustrates a third embodiment 106 of the preferred backflash interrupter device. This embodiment also includes a preferred rectangularly-shaped chamber base 66 but with chamber openings 108,110 presenting a preferred square-shaped cross section, and with respective conductor pipes 112,114 also presenting square-shaped cross-sections. Device 106 also includes vent cap 116, hinge 118, valve flap 120, valve flap stop 122, and valve flap retainer 124.

Hinge 118 shiftably couples vent cap 116 to chamber base 66 along one edge thereof adjacent conductor pipe 114. This allows vent cap 116 to shift between the closed position as shown in solid lines in FIG. 5 to the open position shown in dashed lines.

Square-shaped valve flap 120 is preferably an integral extension depending from one side of vent cap 116 and extends downwardly when cap 116 is in the closed position into an appropriately defined recess 126 along the interior surface of conductor pipe 114.

In the event a pressure wave in excess of a predetermined level enters chamber 22 by way of conductor pipe 112, vent cap 116 shifts to the open position which shifts valve flap 120 to the closed position as shown in dashed lines in FIG. 5. Upon reaching the closed position, valve flap 120 and attached vent cap 116 are prevented from further movement by stop 122 and are retained in that position by retainer 124. Any subsequent flame front from pipe 112 is thereby prevented from entering pipe 114.

Retainer 124 is preferably in form of a relief spring coupled to the interior wall of connector pipe 114 on the opposite side thereof from recess 126. As valve flap 120 shifts to its closed position, retainer 124 is depressed into relatively flat engagement with the interior wall of connector pipe 114. After flap 120 reaches the closed position, retainer 124 springs back to the position shown to retain flap 120 in its closed position.

As those skilled in the art will appreciate, the present invention encompasses many variations other than those illustrated and discussed herein. For example, at a juncture of three or even more pipes or ducts, the backflash interrupter device hereof can be designed for coupling with all of the pipes or ducts at the juncture thereby providing a very economical installation. In addition, the preferred device can be configured for pipe or duct, square or round, or other shapes, as a matter of design choice. Furthermore, the device hereof can be designed to vent at a desired level of predetermined pressure.

Having thus described the preferred embodiments of the present invention, the following is claimed as new and desired to be secured by Letters Patent:

1. An interrupter device for in-line placement in a run of pipe, duct, or the like conducting fluids or fluidized particles for preventing a pressure wave and any subsequent flame front traveling therealong from passing beyond said device into an adjacent portion of said run and equipment and areas connected thereto, said run presenting respective first and second spaced-apart, portions thereof, said device comprising:

chamber structure defining an enclosed fluid transfer chamber and including pressure responsive vent means for opening said chamber for exterior venting upon the occurrence of a predetermined level of pressure therein;

a first fluid-conducting member presenting a first fluid port and coupled with said chamber structure in order to fluidically couple said chamber with said first port;

a second fluid-conducting member presenting a second fluid port and coupled with said chamber structure in order to fluidically couple said chamber with said second port, said members and chamber structure defining a fluid flow path between said ports by way of said chamber, said members being coupled with said chamber structure in a non-aligned relationship relative to one another in order to prevent direct in-line fluid flow between said members by way of said chamber; and respective first and second connecting means for fluidically connecting said first port with the first run portion and said second port with the second run portion respectively in order to place said apparatus in an in-line relationship with the run of pipe, duct, or the like, said vent means including a dome-shaped vent cap defining at least a portion of said fluid flow path between said ports by way of said chamber.

2. The device as set forth in claim 1, each of said conducting members presenting a tubular configuration and a chamber connection end, said members being coupled with said chamber structure with said respective ends in a concentric relationship thereat.

3. The device as set forth in claim 1, each of said members being coupled with said chamber structure in a spaced-apart, generally parallel relationship in the vicinity of said chamber.

4. The device as set forth in claim 1, said connecting means connecting the respective run portions in an axially aligned relationship.

5. The device as set forth in claim 1, the fluid-conducting run being operable for conducting fluid therein at a pressure less than ambient pressure, said vent means presenting surface structure allowing the differential between ambient pressure and the pressure within the run to hold said vent means in a chamber-enclosing relationship relative to said chamber structure, and allowing a rise in pressure within the run above ambient pressure to open said chamber for said exterior venting.

6. The device as set forth in claim 1, said conducting members presenting respective, adjacent, chamber ends connected with said chamber structure, said vent means being located on an opposed side of said chamber structure from said ends so that upon occurrence of said exterior venting, the pressure wave and any subsequent flame front emanating from one of said ends is vented from said chamber and thereby prevented from entering the other of said ends.

7. An interrupter device for in-line placement in a run of pipe, duct, or the like conducting fluids or fluidized particles for preventing a pressure wave and any subsequent flame front traveling therealong from passing beyond said device into an adjacent portion of said run and equipment and areas connected thereto, said run presenting respective first and second spaced-apart, portions thereof, said device comprising:

chamber structure defining an enclosed fluid transfer chamber and including pressure responsive vent means for opening said chamber for exterior venting upon the occurrence of a predetermined level of pressure therein;

a first fluid-conducting member presenting a first fluid port and coupled with said chamber structure in order to fluidically couple said chamber with said first port;

a second fluid-conducting member presenting a second fluid port and coupled with said chamber structure in order to fluidically couple said chamber with said second port, said members and chamber structure defining a fluid flow path between said ports by way of said chamber, said members being coupled with said chamber structure in a non-aligned relationship relative to one another in order to prevent direct in-line fluid flow between said members by way of said chamber; and respective first and second connecting means for fluidically connecting said first port with the first run portion and said second port with the second run portion respectively in order to place said apparatus in an in-line relationship with the run of pipe, duct, or the like, said first and second members presenting respective chamber connection ends, said device further including closure means for closing at least one of said ends for blocking fluid communication between the conducting member associated therewith and said chamber in the event of said opening of said chamber by said vent means.

8. The device as set forth in claim 7, said closure means including a closure flap for fluidically closing said one end, means shiftably coupling said flap with said device adjacent said one end for shifting of said flap between a closed position in which said flap is in a fluid closing relationship with said one end, and an open position allowing fluid flow communication cation between said chamber and the conducting member associated with said one end, means biasing said flap toward said closed position, and releasable flap holding means for releasably holding said flap in said open position when said vent means is in a closed relationship relative to said chamber, and for releasing said flap for biased shifting to said closed position during opening of said chamber.

9. The device as set forth in claim 8, further including closure means for each of said ends.

10. The device as set forth in claim 7, said vent means including a vent cap, said device further including hinge means hingedly coupling said cap with said chamber structure for shifting of said cap between open and closed positions, said closure means including a valve flap coupled with said vent cap and shiftable therewith for closing said one end when said cap is in said open position, and for allowing fluid communication between said chamber and the conducting member associated with said one end when said vent cap is in said closed position.

* * * * *